Figure 1:
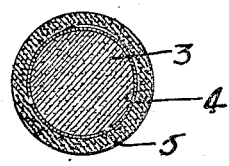

Dec. 20, 1927.

B. F. STEEL

1,653,378

METHOD OF MAKING BIMETALLIC WIRE

Filed July 1, 1922

INVENTOR
BENJAMIN F. STEEL.
BY
ATTORNEY

Patented Dec. 20, 1927.

1,653,378

UNITED STATES PATENT OFFICE.

BENJAMIN FRANKLIN STEEL, OF EAST ORANGE, NEW JERSEY, ASSIGNOR TO WESTING-HOUSE LAMP COMPANY, A CORPORATION OF PENNSYLVANIA.

METHOD OF MAKING BIMETALLIC WIRE.

Application filed July 1, 1922. Serial No. 572,307.

This invention relates to the manufacture of wire suitable for sealing into glass and more particularly to the process of making bi-metallic or dumet wire whereby defects therein are made apparent.

An object of my invention is the elimination of defective portions of bi-metallic wire during the process of manufacture.

Another object of my invention is the development of visual indications of defects during the manufacture of bi-metallic or dumet wire by suitable heat treatment whereby defective wire may be eliminated before being finished.

A further object of my invention is the manufacture of bi-metallic or dumet wire in which the bond or union between the core and the sheath is perfect.

A still further object of my invention is the elimination of bi-metallic material, intended for the manufacture of dumet wire, in which there is any space between the core and the sheath thereof, before the same is drawn to final size, by annealing the same quickly to a temperature sufficiently high to cause blistering adjacent such an imperfection, whereby that part of the same may be detected and discarded.

Other objects and advantages will be developed as the description proceeds.

Seal wire or that commonly used for leading-in conductors for incandescent electric lamps and the like is a bi-metallic combination of a nickel-iron core over which a sleeve or sheath of copper is brazed with brazing brass. As well known to those skilled in the art, such composite or bi-metallic wire is designated and referred to as dumet. When manufactured according to the usual method a strip of brazing brass is wrapped around a nickel-iron rod and the whole inserted in a copper tube, making a close fit. The composite rod is then drawn down to size, being annealed at intervals.

According to the usual process, the composite rod, when drawn down to a diameter of approximately ¼", is "pot annealed", that is, it is gradually heated to the proper annealing temperature. The rod may then be further reduced and is preferably annealed twice more before it reaches a finished size. It has always been difficult to obtain a perfect union between the core material and the copper sheath for long lengths. When there are portions in this composite rod which are not brazed or properly united, that is, where there are portions which are not completely filled by the intermediate strip of brazing brass, there is a void or gas space which elongates when the composite rod is reduced in section and is not detachable by inspection when made by the usual process.

If portions of the wire with gas inclusions are not detected and cut out, a void will be formed in the finished wire extending a considerable distance. If such wire is sealed into lamps, air will slowly enter through the void and cause what is termed "leakers" or gassy lamps. When such composite material is annealed slowly, according to the usual method, both materials of perfect bond and materials with gas inclusions are annealed without any differences being apparent. It is, therefore, impossible, according to the usual method, to detect defective bi-metallic wire previous to its use as a leading-in conductor for an incandescent lamp or the like.

According to my invention, I form a composite rod in the usual manner by wrapping a strip of brazing brass around a nickel-iron core rod. The outer copper sheath may then be applied thereover and the rod drawn down in the usual manner to approximately ¼" or until it becomes so hard that annealing becomes necessary or desirable. The wire may then be annealed by being passed directly through a furnace where it is heated quickly to the annealing temperature instead of gradually, as heretofore described. This quick heating will cause defective portions of the wire to develop blisters on the sheath, that is, any gas inclusions between the core and sheath will expand so quickly that they will raise the softened copper sheath away from the nickel-iron core to cause a blistered appearance. These blistered portions of the wire may then be discarded and the smooth portions only drawn down to approximately ⅛", for example, when it will probably be found desirable to anneal again, because the wire will probably have hardened considerably.

The bi-metallic wire may then be further annealed in the same manner as heretofore described and may again possibly develop blisters, if there were gas inclusions previously present which, for some reason or other, did not show up on the wire of larger size. Any blistered portions of this wire may then be removed and the perfect wire only drawn down further to, for example, approximately 1/16", when it may be found desirable to re-anneal because of the hardening effect of the wire-drawing. Although it is not likely that any more blistering will occur on the third annealing, yet if this should happen the blistered wire should be discarded and the remaining perfect wire drawn down to finished size. It will be found that wire prepared in this manner will be perfectly bonded and, when used as leading-in conductors in incandescent lamps and the like, will not allow any air to leak through.

Figure 2:
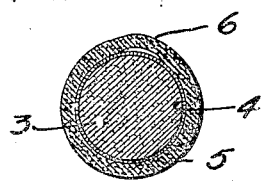

My invention more in detail comprises the manufacture of bi-metallic or dumet wire as follows, reference being made to the accompanying drawing in which Fig. 1 is an enlarged sectional view of bi-metallic or dumet wire before annealing; and, Fig. 2 is a similar view of such wire after annealing according to my invention.

A rod of nickel-iron 3 preferably .415 inches in diameter and 5 feet, 1 inch long copper-plated as usual, if desired, is wrapped with a strip of brazing brass 4 about 4 feet, 9 inches long, 1 5/16 inches wide and .0025 inches thick. That is, the width of the brazing brass is about the same as the circumference of the nickel-iron rod so that it will wrap around the same. A copper tube 5, outside diameter .522 inches, inside diameter .45 inches, and about 3 feet, 6 inches long, may then be forced over the core rod and brass strip therearound. The composite rod is then drawn down in the usual manner to preferably about 212 mils in diameter. The rod is then passed through an annealing furnace where it is quickly heated to a proper annealing temperature, preferably about 1562° F.

The quick heating of the bi-metallic wire will cause such gas, if any, as may be included between the core and the sheath to quickly expand and swell the sheath away from the core, with the formation of one or more blisters 6 thereon. The blistered portion of the wire, as indicating portions of defective bond between the core and the sheath, may then be cut out and discarded, the remaining portions of the wire being drawn down further, for example, to 116 mils in diameter. It will then be found desirable to re-anneal the wire, by passing it through the same or a similar furnace where it will be quickly heated to approximately the same temperature as before. Any defective portions of the wire, that is, any portions where there are gas inclusions between the core and the sheath which were missed on the first annealing, will show up on this second annealing in the form of one or more blisters and may be removed and the perfect portions of the wire only drawn down further.

The wire is then preferably drawn until it is approximately 50 mils in diameter, when it is further annealed in the same manner as heretofore described. Although it is very improbable that any further blistering will occur on the third annealing, yet, if blistering should take place, such blistered portions 6 should be removed and the perfect wire only drawn down to finished sizes, for example, to from 40 to 8 mils in diameter.

From the foregoing description of my invention, it will be apparent that I have devised a method whereby defective bi-metallic or dumet wire is conveniently indicated before it reaches a finished size, so that it will not find its way into incandescent lamps or the like, where it might subsequently allow air to leak into the evacuated portion thereof to ruin the lamp. It is thought that the reason why blistering did not occur when the wire was manufactured according to the usual method, that is, where it was "pot annealed" or slowly heated to the annealing temperature, is because the gas inclusion then had a chance to slowly expand and dissipate gradually along the length of the wire without producing a sufficient pressure between the core and the sheath to raise the sheath in the form of a blister.

While I have described what I now consider to be a preferred method of practicing my invention, it is to be understood that the same is merely illustrative and that my invention is limited only by the scope of the appended claims.

What is claimed is:

1. The method of treating a bi-metallic material which comprises expanding gases within pockets interiorly of the material to cause eruptions upon the surface thereof to render visible defects within the material and removing portions of said material having visible defects.

2. The method of eliminating defects from bi-metallic material intended to be drawn down to form leading-in conductors, comprising heating the same quickly to the annealing temperature and discarding such portions thereof as may develop blisters.

3. The method of treating material for dumet wire including a core, a sheath and bonding means therebetween comprising heating the same quickly to the annealing temperature thereof and discarding such portions thereof as develop raised portions thereon, as indications of defective union between core and sheath, so that only material of perfect union will be drawn to finished size.

4. The method of manufacturing dumet wire comprising wrapping a strip of brazing material around a rod of core material, forcing a copper tube thereover, drawing down and annealing the same by heating rapidly to the proper annealing temperature.

5. The method of manufacturing dumet wire comprising wrapping a strip of brazing brass around a nickel-iron rod, forcing a copper tube thereover, drawing the whole to approximately ¼" in diameter, passing the same through an annealing furnace wherein it is quickly heated to a temperature suitable for properly annealing the material, discarding portions of the material which show defects thereon and drawing the perfect material only down to finished-wire sizes.

6. The method of manufacturing bi-metallic wire comprising forming a rod with an iron alloy core, a copper sheath thereover and brazing material therebetween, drawing the rod until annealing of the same is required, passing the material through an annealing furnace wherein it is quickly heated to a proper annealing temperature, with the formation of blisters on portions of the wire where there is a defective bond between the core and the sheath, discarding such blistered portions of the wire and drawing down only the perfect wire to finished sizes.

7. The method of forming bi-metallic wire whereby only perfect wire is produced in finished sizes, comprising forming a bi-metallic rod comprising an inner core of a suitable iron alloy, an outer sheath of copper and an intermediate portion of brazing material, drawing the rod into wire until annealing is required, passing the wire through a furnace wherein it is quickly heated to the desired annealing temperature whereby defective portions thereof emerge therefrom in a blistered condition, discarding such blistered portions and drawing the remaining wire to finished sizes.

8. The method of treating a bi-metallic rod during the process of forming the same into finished wire, comprising drawing the rod into wire until annealing of the same becomes necessary, passing the wire through a furnace wherein it is quickly heated to a suitable annealing temperature, discarding portions of said wire which may develop blisters, drawing the remainder of the wire until annealing of the same again becomes necessary, passing said wire through a furnace wherein it is quickly heated to a suitable annealing temperature, discarding any blistered wire which may be developed thereby and drawing the remaining perfect wire down to useful-wire size.

9. The process of treating a bi-metallic rod whereby it is formed into perfect dumet wire, comprising drawing the rod into the wire until the same hardens so that annealing becomes necessary, treating the wire in an annealing furnace whereby it is quickly heated so that defective portions thereof are indicated by blistering of the wire, eliminating said blistered portions, drawing the remaining wire until further annealing becomes necessary, again treating said wire in an annealing furnace wherein it is quickly heated so that defective portions thereof show up as blisters, removing any blistered portions and drawing the remaining wire down until further annealing is required, treating said wire by quickly heating it to an annealing temperature so that any defective portions thereof become blistered, discarding said blistered portions and drawing the remainder down to the desired sizes.

10. The method of manufacturing a wire composed of layers comprising wrapping a strip of brazing material around a rod of core material, forcing a copper tube thereover to provide a composite body, drawing down said body and treating the same to effect an expansion of gas to render visible pockets between the constituent layers of the body.

11. The method of manufacturing a composite wire composed of layers comprising wrapping a strip of brazing material around a rod of core material, forcing a copper tube thereover to provide a composite body, alternately drawing down the body and rapidly heating said body to expand any gases between the layers to render visible portions of the wire not properly united.

12. The method of manufacturing a composite wire comprising wrapping a strip of brazing material around a rod of core material, forcing a copper tube thereover to provide a composite body, drawing down said body and treating the same to cause a rapid expansion of the gas to produce blisters and render visible the presence of voids between the layers and removing sections of wire containing voids.

In testimony whereof, I have hereunto subscribed my name this 30th day of June 1922.

BENJAMIN FRANKLIN STEEL.